US010708488B2

(12) United States Patent
Hanover

(10) Patent No.: US 10,708,488 B2
(45) Date of Patent: Jul. 7, 2020

(54) EYEWEAR DEVICE MODE INDICATION

(71) Applicant: Snap Inc., Santa Monica, CA (US)

(72) Inventor: Matthew Hanover, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/717,637

(22) Filed: Sep. 27, 2017

(65) Prior Publication Data

US 2018/0091729 A1 Mar. 29, 2018

Related U.S. Application Data

(60) Provisional application No. 62/400,241, filed on Sep. 27, 2016.

(51) Int. Cl.

| H04N 5/232 | (2006.01) |
| G03B 17/56 | (2006.01) |
| G03B 17/48 | (2006.01) |
| G02C 11/04 | (2006.01) |
| H04N 5/225 | (2006.01) |
| G02C 11/00 | (2006.01) |
| G06F 3/0346 | (2013.01) |

(52) U.S. Cl.
CPC ......... *H04N 5/23216* (2013.01); *G02C 11/04* (2013.01); *G02C 11/10* (2013.01); *G03B 17/48* (2013.01); *G03B 17/56* (2013.01); *G06F 3/0346* (2013.01); *H04N 5/2253* (2013.01); *H04N 5/2256* (2013.01); *H04N 5/2257* (2013.01); *H04N 5/23245* (2013.01)

(58) Field of Classification Search
CPC ............. H04N 5/23216; H04N 5/2256; H04N 5/2257; H04N 5/23245; G02C 11/04; G02C 11/10; G03B 17/56; G06F 3/0346

USPC .............. 345/158; 348/81, 158, 294; 705/21
See application file for complete search history.

(56) References Cited

U.S. PATENT DOCUMENTS

| 6,038,295 A | 3/2000 | Mattes | |
| 6,084,557 A * | 7/2000 | Ishida | G02B 27/017 345/7 |

(Continued)

FOREIGN PATENT DOCUMENTS

| CA | 2887596 A1 | 7/2015 |
| CN | 103885206 B | 6/2015 |

(Continued)

OTHER PUBLICATIONS

"U.S. Appl. No. 15/717,663, Non Final Office Action dated Dec. 5, 2018", 22 pgs.

(Continued)

*Primary Examiner* — Prabodh M Dharia
(74) *Attorney, Agent, or Firm* — Schwegman Lundberg & Woessner, P.A.

(57) ABSTRACT

An electronics-enabled eyewear device includes a mode indicator comprising a series of light emitters arranged on a forward-facing surface of the eyewear device, for example being provided by a ring of LEDs arranged peripherally about a camera lens opening in a front surface of an eyewear frame. The mode indicator automatically displays different visual indications corresponding to different modes of operation or states of the eyewear device. One visual indication provides an animated pattern of circulating LEDs during video capture by the eyewear device.

16 Claims, 8 Drawing Sheets

(56) References Cited

U.S. PATENT DOCUMENTS

| | | | |
|---|---|---|---|
| 6,712,471 B1* | 3/2004 | Travis | G02B 3/00 |
| | | | 345/8 |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,830,071 B1 | 11/2017 | Patel et al. | |
| 2002/0027548 A1* | 3/2002 | Yoneno | G06F 3/0325 |
| | | | 345/167 |
| 2007/0046887 A1 | 3/2007 | Howell et al. | |
| 2007/0183152 A1* | 8/2007 | Hauck | F21S 10/00 |
| | | | 362/249.07 |
| 2008/0192114 A1* | 8/2008 | Pearson | G03B 17/08 |
| | | | 348/81 |
| 2008/0199829 A1* | 8/2008 | Paley | A61B 5/4547 |
| | | | 433/215 |
| 2010/0045928 A1* | 2/2010 | Levy | H04M 1/05 |
| | | | 351/158 |
| 2010/0180298 A1 | 7/2010 | Kim et al. | |
| 2010/0309535 A1* | 12/2010 | Landowski | G02B 27/2264 |
| | | | 359/107 |
| 2011/0063521 A1 | 3/2011 | Karaoguz | |
| 2011/0202598 A1 | 8/2011 | Evans et al. | |
| 2012/0068921 A1 | 3/2012 | Jacobsen et al. | |
| 2012/0081294 A1 | 4/2012 | Dinh et al. | |
| 2012/0200695 A1* | 8/2012 | Yannane | B23K 11/3063 |
| | | | 348/90 |
| 2012/0209924 A1 | 8/2012 | Evans et al. | |
| 2012/0294478 A1 | 11/2012 | Publicover et al. | |
| 2013/0097038 A1* | 4/2013 | Potter | G06Q 30/00 |
| | | | 705/21 |
| 2013/0214998 A1 | 8/2013 | Andes et al. | |
| 2013/0265507 A1* | 10/2013 | Ford | G02C 7/04 |
| | | | 349/13 |
| 2014/0152316 A1 | 6/2014 | Stanek et al. | |
| 2014/0160424 A1 | 6/2014 | Benko et al. | |
| 2014/0256431 A1* | 9/2014 | Pope | A63F 13/211 |
| | | | 463/31 |
| 2014/0347265 A1 | 11/2014 | Aimone et al. | |
| 2015/0078757 A1 | 3/2015 | Pederson | |
| 2015/0094914 A1* | 4/2015 | Abreu | B60H 1/00742 |
| | | | 701/41 |
| 2015/0169050 A1 | 6/2015 | Publicover et al. | |
| 2015/0244910 A1* | 8/2015 | Marston | G02C 11/10 |
| | | | 348/294 |
| 2015/0331576 A1 | 11/2015 | Piya et al. | |
| 2015/0362759 A1* | 12/2015 | Verkaik | G02C 11/10 |
| | | | 351/51 |
| 2015/0370765 A1* | 12/2015 | Kim | G06F 17/2288 |
| | | | 715/229 |
| 2016/0012465 A1 | 1/2016 | Sharp | |
| 2016/0054802 A1* | 2/2016 | Dickerson | G06F 3/0487 |
| | | | 345/158 |
| 2016/0283081 A1* | 9/2016 | Johnston | G06T 19/006 |
| 2016/0357304 A1 | 12/2016 | Hatori et al. | |
| 2017/0017085 A1* | 1/2017 | Araki | G09G 5/00 |
| 2017/0108715 A1 | 4/2017 | Bauer | |
| 2017/0116476 A1 | 4/2017 | Publicover et al. | |
| 2017/0216720 A1* | 8/2017 | Colenbrander | H04L 67/38 |
| 2017/0242497 A1* | 8/2017 | Andes | G02B 27/017 |
| 2017/0285941 A1 | 10/2017 | Nale et al. | |
| 2017/0308166 A1* | 10/2017 | Mallinson | G06F 3/014 |
| 2017/0324437 A1 | 11/2017 | Ruttler | |
| 2018/0011545 A1* | 1/2018 | Stafford | A63F 13/213 |
| 2018/0088687 A1 | 3/2018 | Hanover | |
| 2018/0101240 A1 | 4/2018 | Carceroni et al. | |
| 2018/0103432 A1 | 4/2018 | Ludwig et al. | |
| 2018/0107025 A1* | 4/2018 | Smit | G02C 7/101 |
| 2018/0227800 A1 | 8/2018 | Wang | |
| 2019/0070498 A1* | 3/2019 | Perry | G06F 3/013 |
| 2019/0108645 A1* | 4/2019 | Ben-Yishai | G06T 11/60 |

FOREIGN PATENT DOCUMENTS

| | | |
|---|---|---|
| CN | 109791346 A | 5/2019 |
| WO | 2018064195 | 4/2018 |

OTHER PUBLICATIONS

"International Application Serial No. PCT/US2017/053774, International Search Report dated Nov. 28, 2017", 4 pgs.

"International Application Serial No. PCT/US2017/053774, Written Opinion dated Nov. 28, 2017", 5 pgs.

Leyden, John, "This SMS will self-destruct in 40 seconds", [Online]. Retrieved from the Internet: <URL: http://www.theregister.co.uk/2005/12/12/stealthtext/. (Dec. 12, 2005), 1 pg.

"U.S. Appl. No. 15/717,663, Final Office Action dated May 22, 2019", 25 pgs.

"U.S. Appl. No. 15/717,663, Response filed Mar. 27, 2019 to Non Final Office Action dated Dec. 5, 2018", 9 pgs.

"International Application Serial No. PCT/US2017/03774, International Preliminary Report on Patentability dated Apr. 11, 2019", 7 pgs.

"U.S. Appl. No. 15/717,663, Response filed Sep. 23, 2019 to Final Office Action dated May 22, 2019", 9 pgs.

"European Application Serial No. 17781600.6, Communication Pursuant to Article 94(3) EPC Oct. 1, 2019", 4 pgs.

"U.S. Appl. No. 15/717,663, Notice of Allowance dated Dec. 5, 2019", 24 pgs.

* cited by examiner

VIDEO CAPTURE

EYEWEAR DEVICE MODE INDICATION

PRIORITY CLAIM

This application claims the benefit of priority of U.S. Patent Application Ser. No. 62/400,241, filed on Sep. 27, 2016, which is hereby incorporated by reference herein in its entirety:

BACKGROUND

Electronics-enabled eyewear devices, such as so-called smart glasses, are often configured for operation with limited or no graphical user interfaces. This applies particularly to untethered wear. Owing to space and weight limitations, control and feedback mechanisms are at a premium.

Moreover, device mode indication is in some instances insufficiently prominent or visible for some use cases.

BRIEF DESCRIPTION OF THE DRAWINGS

Various ones of the appended drawings illustrate merely example embodiments of the present disclosure and should not be considered as limiting its scope. In the drawings:

FIG. 2A illustrates a video capture mode display; FIG. 2B illustrates a photo capture mode display; and FIG. 2C illustrates a battery charge level display.

SPECIFIC DESCRIPTION

The description that follows discusses illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

One of the aspects disclosed by the described embodiments provides for an eyewear device (e.g., a pair of smart glasses) that comprises a mode indicator comprising a series of light emitters (e.g., LEDs) arranged on a forward-facing surface of the eyewear device. Control circuitry incorporated in the smart glasses is arranged to cause the indicator to behave according to different display modes corresponding to different modes of operation or states of the eyewear device. At least some of the display modes may comprise display of an animation pattern by use of the LED ring.

One of the modes of operation for which the indicator has a specific corresponding display mode in which a camera incorporated in the eyewear device captures video content. Location of the indicator on a forward-facing surface of the eyewear device (therefore facing away from a user wearing the eyewear device) serves to provide prominent and readily visible indication of video capture not to the wearer of the eyewear device, but to persons at whom the camera of the device is directed. In this manner, provision of the mode indicator prevents secretive recording by use of the eyewear device, thus promoting trust in wearers of the eyewear devices and furthering societal acceptance of regular use of camera-enabled eyewear devices.

In some embodiments, visibility of at least some of the display modes of the indicator is increased by providing an animated display using the series of light emitters of the indicator. In one example embodiment, the mode indicator comprises a ring of LEDs located around a camera lens or camera analog on a front surface of device frame. With camera analog is meant a formation on the eyewear frame that has the external shape and appearance of a camera lens, without in fact having an associated camera device. In one such example embodiment, an animated display mode corresponding to video capture comprises circulating illumination of the LED ring.

As will be described in greater detail in the description that follows, the indicator may in some embodiments provide display modes corresponding to further operational modes of the camera and/or the eyewear device, including but not limited to respective modes for indicating: photo capture, battery charge level, device pairing status, and system events (e.g., system crashes).

Figure 1:
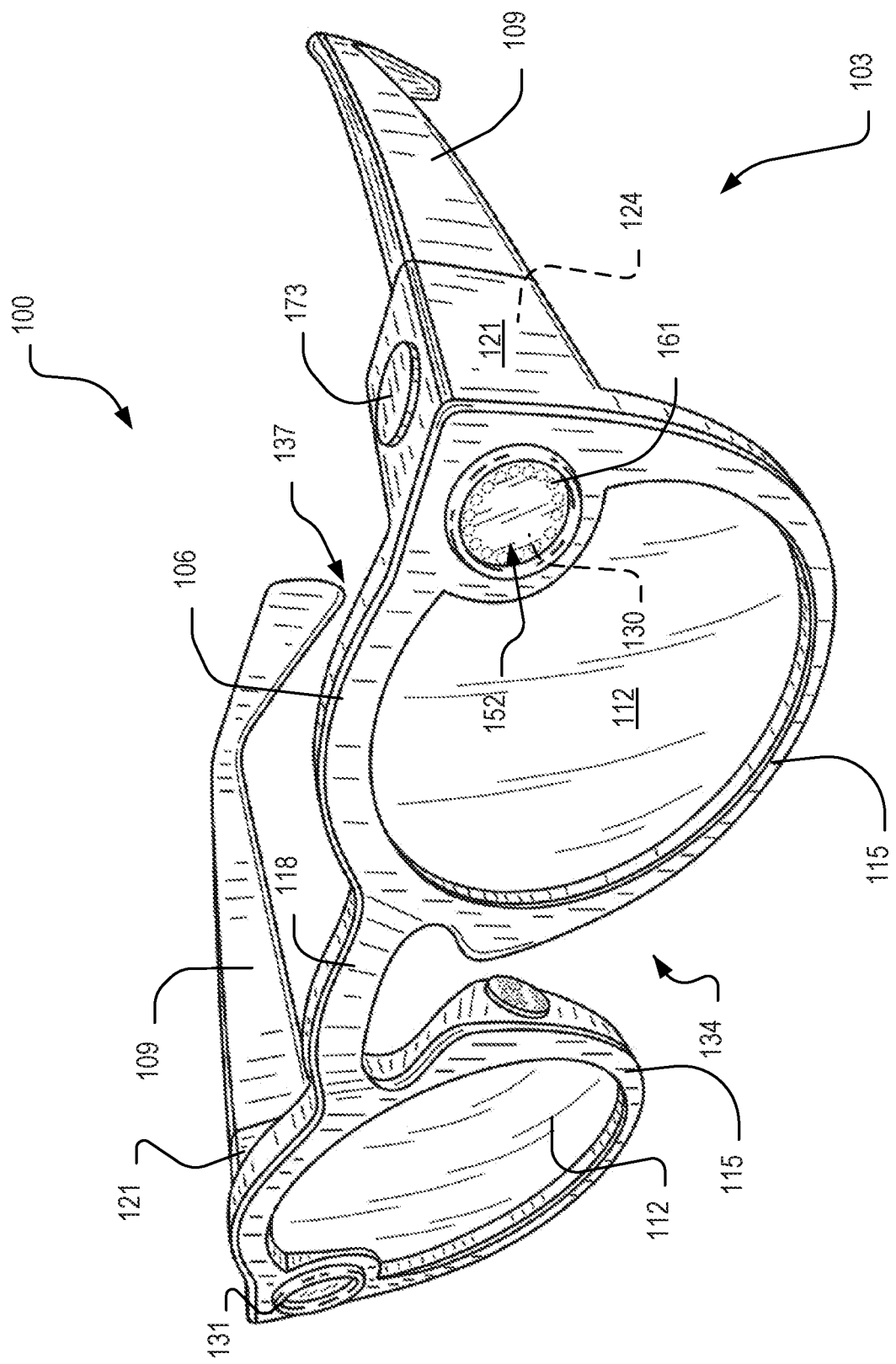
FIG. 1 is a three-dimensional view of a camera-enabled eyewear device in the form of a pair of smart glasses, according to an example embodiment.

FIG. 1 shows a front perspective view of an eyewear device in the form of a pair of smart glasses 100 according to one example embodiment. The glasses 100 include a body 103 comprising a front piece or frame 106 and a pair of temples 109 connected to the frame 106 for supporting the frame 106 in position on a user's face when the glasses 100 are worn. The frame 106 can be made from any suitable material such as plastics or metal, including any suitable shape memory alloy.

The glasses 100 include a pair of optical elements in the form of a pair of lenses 112 held by corresponding optical element holders in the form of a pair of rims 115 forming part of the frame 106. The rims 115 are connected by a bridge 118. In other embodiments, of one or both of the optical elements can be a display (for example providing a virtual reality display), a display assembly, or a lens and display combination (e.g., to provide an augmented reality display or information overlay over an ambient view).

In this description, directional terms such as front, back, forwards, rearwards, outwards and inwards are to be understood with reference to a direction of view of a user when the glasses 100 are worn. Thus, the frame 106 has a front or outwardly directed side 134 facing away from the user when worn, and an opposite rear or inwardly directed side facing towards the user when the glasses 100 are worn.

The frame 106 includes a pair of end pieces 121 defining lateral end portions of the frame 106. In this example, on-board electronics 124 comprising a variety of electronics electronic components are housed in one or both of the end pieces 121, as discussed in more detail below. In some embodiments, the frame 106 is formed of a single piece of material, so as to have a unitary or monolithic construction. In some embodiments, the whole of the body 103 (including both the frame 106 and the temples 109) can be of the unitary or monolithic construction.

The temples 109 are coupled to the respective end pieces 121. In this example, the temples 109 are coupled to the frame 106 by respective hinges so as to be hingedly movable between a wearable mode (as shown in FIG. 1) and a collapsed mode in which the temples 109 are pivoted towards the frame 106 to lie substantially flat against it. The glasses 100 in the collapsed mode presents one or more charging formations on its exterior for engagement with a charging device to allow charging of an on-board battery forming part of the onboard electronics 124. Such charging devices can include charging cables connectable to an external power supply, and a carry case in which the glasses 100 can be docked such as to be charged by a charging battery carried by the carry case.

The onboard electronics 124 including a computing device, such as a computer, which can in different embodiments be of any suitable type so as to be carried by the body 103. In some embodiments, various components of the onboard electronics 124 are at least partially housed in one or both of the temples 109. The onboard electronics 124 includes one or more processors with memory, wireless communication circuitry, and a power source (this example embodiment being a rechargeable battery, e.g. a lithium-ion battery). The onboard electronics 124 comprises low-power, high-speed circuitry, and, in some embodiments, a display processor. Various embodiments may include these elements in different configurations or integrated together in different ways.

As mentioned, the onboard electronics 124 includes a rechargeable battery. In some embodiments, the battery is disposed in one of the temples 109. In this example embodiment, however, the battery is housed in one of the end pieces 121, being electrically coupled to the remainder of the onboard electronics 124.

The pair of glasses 100 is camera-enabled, in this example comprising a camera 130 mounted in one of the end pieces 121 and facing forwards so as to be aligned more or less with the direction of view of a wearer of the glasses 100. The camera 130 is configured to capture digital photographs as well as digital video content. Operation of the camera 130 is controlled by a camera controller provided by the onboard electronics 124, image data representative of images or video captured by the camera 130 being temporarily stored on a memory forming part of the onboard electronics 124.

In some embodiments, the glasses 100 can have a pair of cameras 130, e.g. housed by the respective end pieces 121. In this embodiment, however, the glasses 100 has only the single camera 130 housed in the left-sided end piece 121 (when viewed from the orientation of a user during wearing thereof). An externally identical camera analog formation 131 is, however, symmetrically provided on the right-hand side end piece 121. As used herein, a camera analog or pseudo-camera formation means a formation on the eyewear frame that has the appearance of a camera lens opening and/or housing, but which does not in fact have a functional camera associated therewith. As will be described below, the camera 130 and its associated lens opening 152 in this example embodiment has a mode indicator 161 located in association therewith. In other embodiments, however, the mode indicator 161 may be provided in association with the camera analog formation 131, with the actual camera 130 having no co-located mode indicator. In one such embodiment, for example, a solitary camera 130 is located in the left-sided end piece 121, with a solitary mode indicator 161 being provided in the camera analog formation 131 of the right-sided end piece 121. A benefit of such an arrangement is that there is substantially no possibility of adverse effect of light emissions by the mode indicator during use on image-capturing functionalities of the camera 130. In yet a further embodiment, each of the end pieces 121 has a respective camera 130 and an associated co-located mode indicator 161. In another embodiment, the glasses 100 may have two cameras integrated at opposite ends of the frame 106, with a single mode indicator 161 provided in association with only one of the cameras 130.

Returning now to the example embodiment of FIG. 1, it will be understood that a lens of the camera 130 in conventional fashion faces forwards and is for protective purposes located behind a transparent covering. As can be seen in FIG. 1, a camera housing formation defined by the frame 106 and in which the camera is housed also houses the mode indicator 161, in this example embodiment consisting of a ring of LEDs 207 (see also FIG. 2A) extending circumferentially around the camera lens opening 152. In this example embodiment, the ring of LEDs 207 is located behind the transparent camera cover. In other embodiments, the LED ring can be located outside of the housing, on the exterior of the frame.

In this example embodiment, the LEDs 207 of the mode indicator 161 is thus hidden and substantially obscure when they are switched off, but become visible when powered to emit light. In the drawings, any LED 207 indicated in broken lines are to be understood as being switched off; LEDs 207 are shown to be shining by being depicted in unbroken lines. Different example display modes of the mode indicator 161, corresponding to different respective modes of operation of the glasses 100 and/or the camera 130, will be described later herein with reference to FIGS. 2A-2C.

In addition to the externally visible mode indicator 161, the glasses 100 in some embodiments further include one or more user-oriented mode indicator mechanisms to indicate occurrence of one or more operational modes to a wearer of the glasses 100. In one such embodiment, an LED arrangement is mounted on the inner surface 137 of the frame 106 to be peripherally visible to the wearer when lit. Such an internal mode indicator may be continuously activated during video capture, and may flash simultaneously with photo capture. In this manner, the wearer is apprised of video or photo capture. It will be appreciated that such a user-oriented mode indication mechanism is to be distinguished from the external mode indicator 161 in that the external mode indicator 161 is sized and positioned specifically to alert persons other than the user of video and/or photo capture.

The glasses 100 further include one or more input and output mechanisms permitting communication with and control of the electronics 124. In particular, the glasses 100 include one or more input mechanisms for enabling user control of one or more functions of the camera 130. In this embodiment, one input mechanism comprises a button 173 mounted on the frame 106 so as to be accessible on top of one of the end pieces 121 for pressing by the user. In addition to any other functions that may be controlled by operation of the button 173, the button 173 in this example provides a camera trigger mechanism enabling the user to selectively trigger photo capture or video capture by the camera 130. In the current example embodiment, a photo capture command can be issued by a single, relatively short button press (e.g., shorter than a second), while a video capture command can be issued by a press-and-hold action.

As will be described with reference to some functionalities of the LED ring mode indicator 161, control input from the user is in some example embodiments, however, not restricted to presses of the control button 173. Instead, some embodiments provide for detection of control taps applied by the user to the frame 106 of the glasses 100. Such control tap detection is in some embodiments performed by accelerometers incorporated in the frame 106.

The glasses 100 may include a variety of additional sensors. Such sensors can include inwardly-facing video sensors or digital imaging modules such as cameras that can be mounted on or provided within the inner surface 137 of the frame 106 so as to be facing the user, in addition to outwardly-facing video sensors or digital imaging modules such as the camera(s) 130 previously described. Such sensors, peripheral devices or peripherals can additionally include biometric sensors, location sensors, or any other such sensors.

Figure 2A:
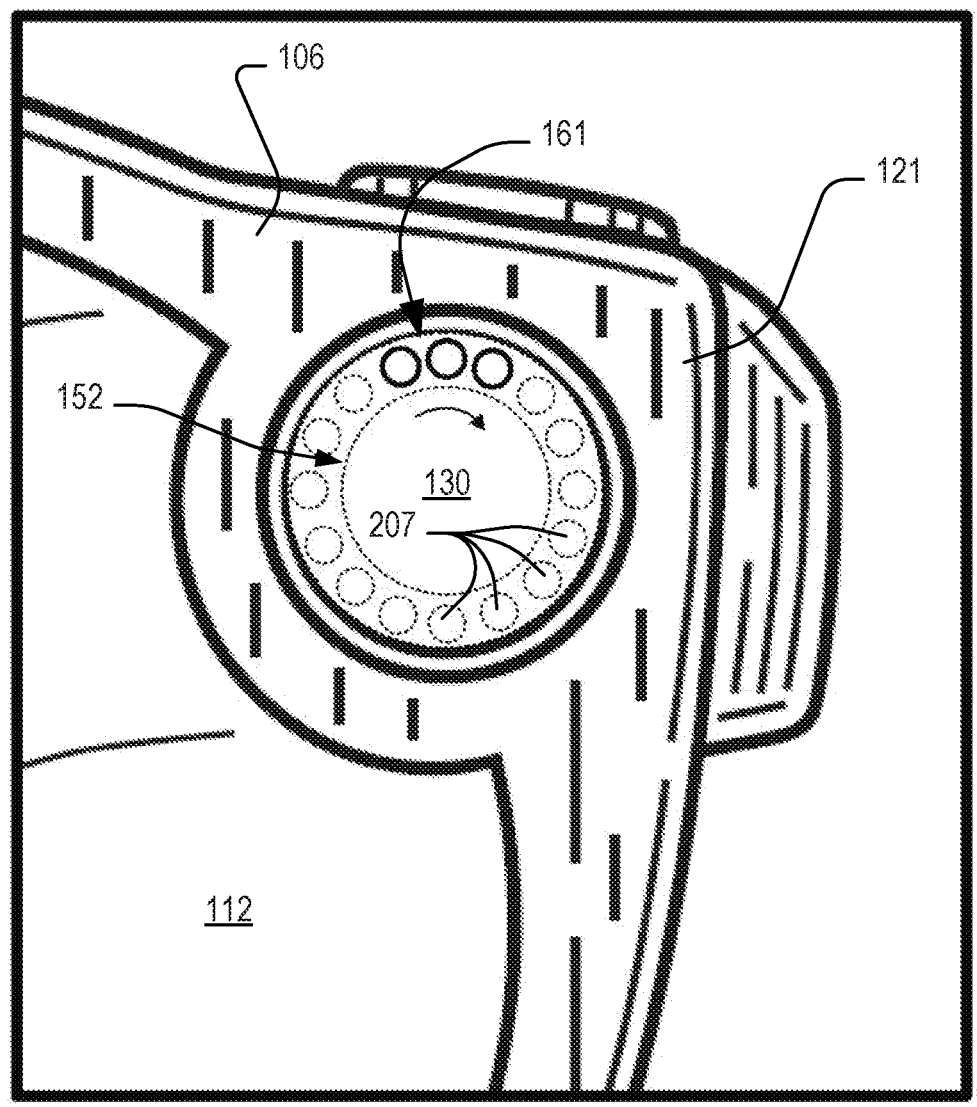
FIG. 2A-2C is a series of schematic views of respective display modes of an LED ring mode indicator forming part of smart glasses corresponding to the example embodiment of FIG. 1.
Figure 2B:
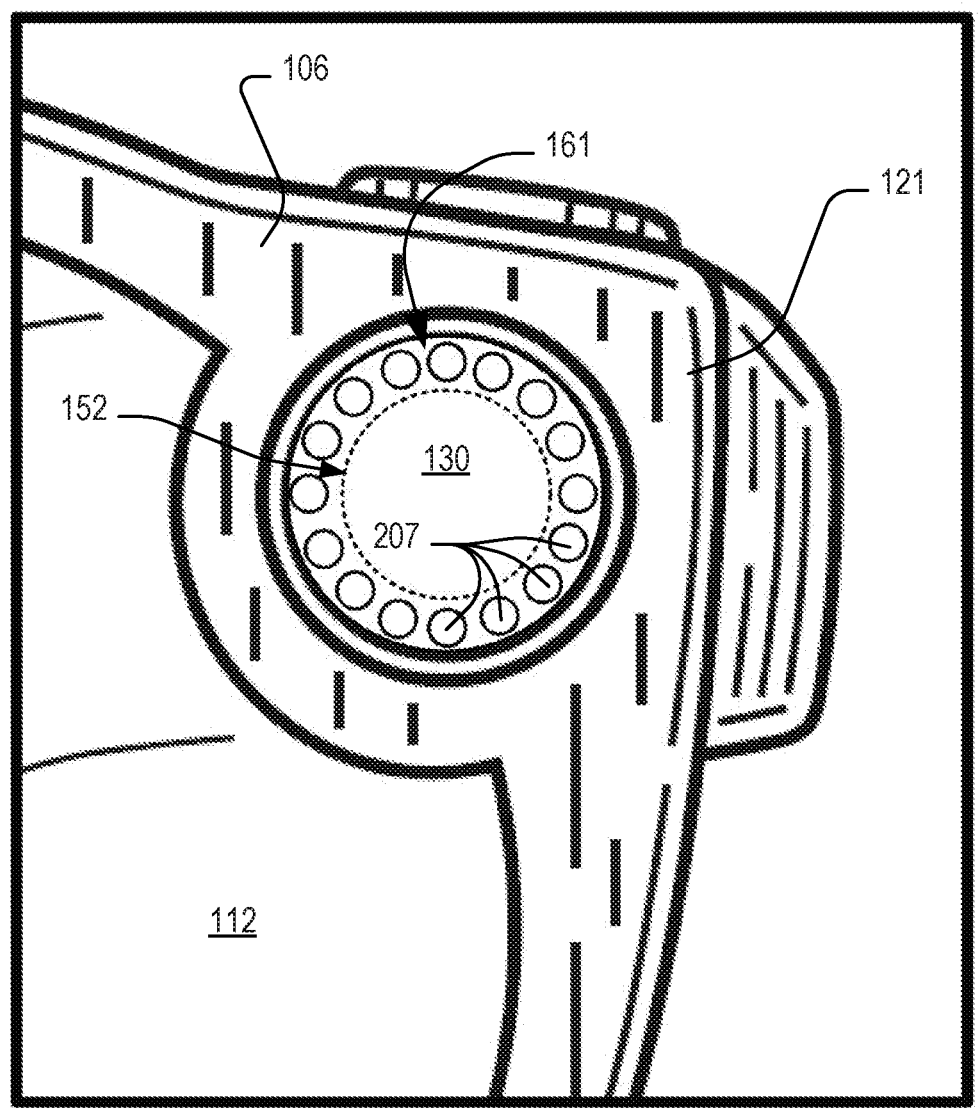
Figure 2C:
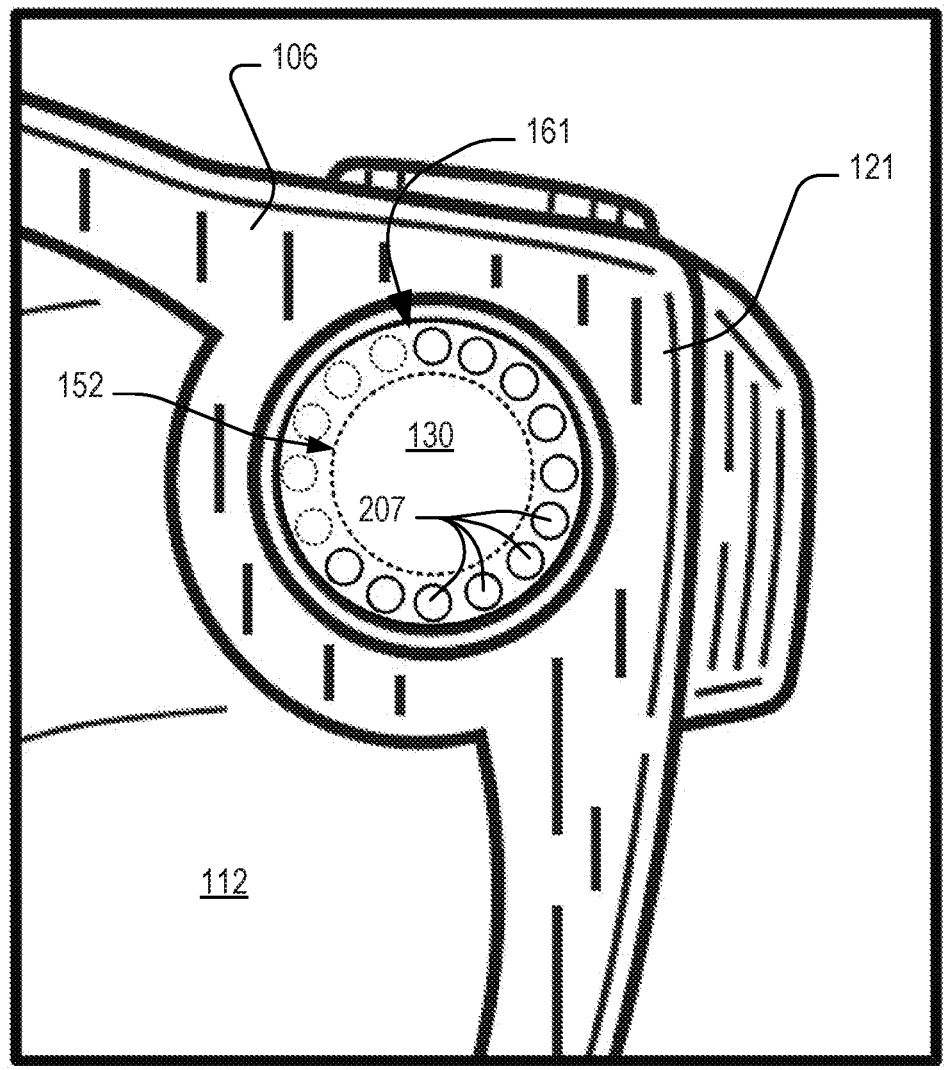

Turning now to the example visual mode indications of FIGS. 2A-2C, it will be seen that the mode indicator 161 in this example embodiment serves to display a plurality of different visual indications corresponding to a plurality of different operational modes of the camera 103 and/or the glasses 100. A first mode of indicator behavior in this example embodiment is illustrated in FIG. 2A, for indicating active video recording. The indication displayed by the LED mode indicator 161 in this instance comprises animated circular movement of activated LEDs 207 around the LED ring 161 (in the direction of the rotational arrow), creating the visual impression of a "comet tail" countdown. Note that this animated display is designed and positioned on the glasses 100 specifically to be highly visible, so as readily to indicate to persons within the vicinity of the smart glasses 100 that video content is being captured by the camera 103.

In some embodiments, the circulating video capture animation of FIG. 2A indicates not only that video is being recorded, but additionally indicates the time remaining for a predefined video clip length. In such case, for example, the animation may circulate once in a 10 second recording interval. In another embodiment, animated video capture indication may comprise a circulating countdown of illuminated LEDs 207. In one such embodiment, the full LED ring 161 is illuminated at the outset of the predefined recording period (e.g., 10 seconds), progressively being counted down to expiry of the recording period. In an alternative embodiment, the LED ring of the mode indicator 161 charges up towards completion.

A second example mode of operation indicated by the LED ring mode indicator 161 is illustrated with reference to FIG. 2B. This mode is for photo capture, and in this embodiment comprises a single flash or short-interval activation of the full ring of LEDs 207. Thus, when the user presses the button 173 to trigger photo capture, the mode indicator 161 displays a single full ring flash substantially simultaneously with the capturing of a photo by use of the eyewear device 100. Note that, distinct from flash lighting in conventional camera devices, the flashing of the mode indicator 161 is displayed regardless of ambient light conditions. As previously, the prominent placement of the mode indicator, its readily perceptible association with camera functionalities of the glasses 100, and the relatively high visibility of the photo capture indication, secretive photo capturing by a wearer of the glasses 100 is inhibited by operation of the mode indicator 161.

It is additionally to be noted that invariable display of both the video capture indication of FIG. 2A and the photo capture indication of FIG. 2B is systemically enforced and is non-optional, being unalterably produced by the mode indicator 161 at each instance of video capture or photo capture. The glasses 100 in other words provide no user-accessible option for deactivating or otherwise altering the video capture notification and/or the photo capture notification. Such non-customizability of mode indication serves to further trust by others that they are not being photographed or video-taped without their knowledge, thereby increasing the likelihood of wide-spread acceptance and the lessening of suspicion against wearers of camera-enabled eyewear devices.

Note that, in this example embodiment, the luminescence of the LEDs 207 is insufficient for the mode indicator 161 to serve the dual purpose of illumination for flash photography. In other embodiments, however, the LEDs 207 may be configured to provide flash illumination in addition to the mode indicator functionalities described herein. Such flash functionalities can be enhanced by providing a respective ring of LEDs 207 at each lateral end of the eyewear frame 106.

FIG. 2C schematically illustrates a further display mode of the indicator 161, in which not only an operational mode, but also an attribute value associated with camera operation is indicated. In the example of FIG. 2C, the operational mode indicated by the mode indicator 161 is a battery charging mode, with the ring of LEDs 207 additionally serving to indicate a current charging level of the onboard battery of the pair of glasses 100. As can be seen in FIG. 2C, battery charge level is indicated by illuminating a portion of the LED corresponding to a portion of battery charge remaining. Illumination of the full ring of LEDs 207 thus indicates a full charge, a half-lit display indicates 50% charge level, and so on. In some embodiments, a lesser proportion of the LED ring can be used to indicate a full charge.

In this example embodiment, battery charge level indication can be triggered by two different mechanisms, namely in (1) a charge checking operation, and (2) by charging of the onboard battery 391. In this example embodiment, charge checking display can be triggered by means of a tap command channel that is responsive to user input via tapping of the eyewear frame 106 in one or more predefined sequences. In particular, a rapid double tap to the glasses 100 (e.g., a pair of taps that is spaced by less than a predefined threshold interval) is detected by onboard accelerometers (e.g., forming part of a tap input mechanism 319 as described with reference to FIG. 3 below) as indicating a charge level display command. The charge level display (as shown in FIG. 2C) can be selectively removed by the user via application of a similar double-tap input. Instead, or in addiction, the mode indicator 161 can in some embodiments revert to a dormant mode after a predefined display period subsequent to triggering of the charge level display via the tap input mechanism 319.

Figure 3:
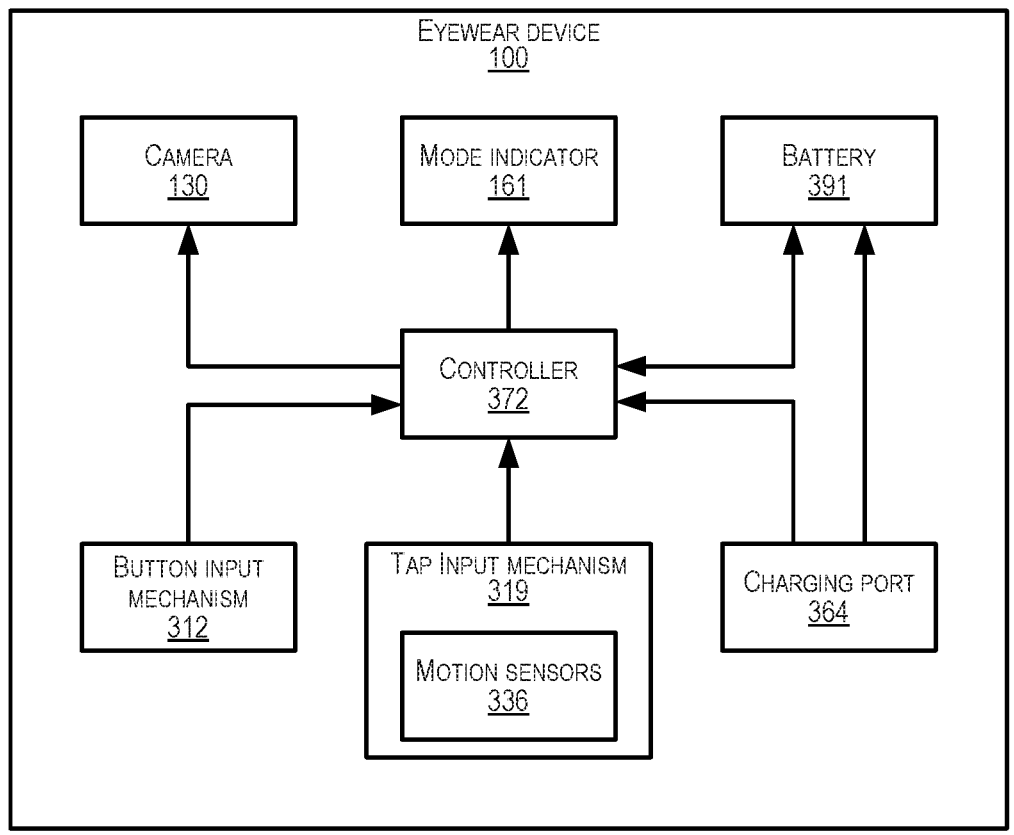
FIG. 3 is a schematic diagram of an eyewear device according to an example embodiment.

The second method of triggering charge level display comprises automatic display of charge level indication by the mode indicator 161 when the glasses 100 are connected to an external charging device for charging of its onboard battery 391 in FIG. 3). Thus, when a charging port 364 (see FIG. 3) incorporated in the eyewear frame 106 is coupled to a charging cable connected to an external power source, such as mains power, the mode indicator automatically switches to charge level indication. Similarly, when the glasses 100 is docked in a complementary carry case with native charging functionality, engagement of the charging port 364 on the glasses 100 with a complementary docking formation in the case automatically causes display of the charge level indication by the mode indicator 161 of the glasses 100.

A number of additional display modes/animations for LED ring mode indicator 161 in this example embodiment includes:

a. Backup Pairing—the full ring of LEDs 207 flashes at different frequencies when backup pairing mode is triggered, and when backup pairing mode needs to be confirmed by another button tap. For example, a 5 second press and hold on the button 173 enters backup pairing, then a single button press confirms.

b. Reset Trigger (recovery flash)—this mode enables user interaction to reset the onboard electronics 124 of the glasses 100 by prolonged pressing of the control button 173. E.g., a single LED 207 lights up after a 50 second press and hold, followed by three LEDs 207 lighting up when the user removes his/her finger. Another button press will then trigger the reset.

c. Reset (recovery flash)—a unique animation may indicate that recover flash is in progress. E.g., three LEDs 207 spinning around the ring, with a 50% dim progress bar counting up. Indicates to the user the progress of the recovery flash (1-2 minute duration). Note that some embodiments thus provide for animations using graduated light intensities for at least some of the LEDs 207 in the mode indicator 161. This is to be distinguished from display in which each LED 207 operates in a binary mode in which it is at any one time either on or off.

d. Crash—A unique animation may be provided on boot after a system crash.

e. Error States—Low Battery, Low/High Temperature, Storage System Full, Critical Error (recovery flash needed). In one embodiment, each of these medications are displayed when the user attempts to take a video but cannot due to one of the above issues.

Turning now to FIG. 3, therein is shown a schematic diagram of an eyewear device 100 in the example form of the pair of smart glasses described with reference to FIGS. 1-2, the diagram showing selected components involved with provision of the functionalities described previously with reference to FIGS. 1 and 2, and further described below with reference to FIG. 4.

As shown in the diagram of FIG. 3, the eyewear device 100 includes a controller 372 forming part of the onboard electronics 124 incorporated in the frame 106 of the device (see, e.g., FIG. 1). The controller 372 in this example forms part of an onboard computing device and comprises circuitry configured to control automated operation of various components of the eyewear device, including the previously described onboard camera 130, mode indicator 161, and onboard battery 391. In some embodiments, the circuitry of the controller 372 may be provided by permanently configured circuitry (e.g., in the form of an application specific integrated circuit). In other embodiments, the circuitry of the controller 372 may comprise dynamically reconfigurable circuitry provided by a processor executing machine-readable instructions for performing the various automated operations. Thus, during execution of particular instructions, the processor provides circuitry configured to perform corresponding operations.

The eyewear device 100 includes a button input mechanism 312 that is activatable by pressing of the button 173 (FIG. 1). The button input mechanism 312 is communicatively coupled to the controller 372 to communicate user commands received by button input mechanism 312, e.g. to trigger video capture or photo capture. The controller 372 is in turn connected to the camera 130 to control camera operation responsive to reception of such commands.

The eyewear device 100 further includes a tap input mechanism 319 to receive and interpret user commands communicated to the device by manual or physical taps imparted to the eyewear frame 106. To this end, the tap input mechanism 319 includes an array of motion sensors 336 comprising accelerometers to detect motion of the eyewear frame 106 indicative of a user's tapping the frame 106. The tap input mechanism 319 is further configured to distinguish between, based on predefined identification criteria, frame movement resulting from user taps and frame movement resulting from incidental or non-semantic frame movement. Such identification criteria can include identifying two successive tap motions experienced by the frame, determining an interval between the detected motions, and identifying reception of a charge level display command only if the interval between the taps is smaller than a predefined threshold period. The tap input mechanism 319 is conductively coupled to the controller 372 to communicate reception of user inputs via the tap command channel.

As previously described, the eyewear device 100 further includes a charging port 364 that is electrically coupled to the onboard battery 391. The charging port 364 is configured for coupling to an external connector to allow charging of the onboard battery 391 via an external power supply. The charging port 364 is communicatively coupled to the controller 372 to communicate to the controller 372 a connection status of the charging port 364. The controller 372 is further communicatively coupled to the onboard battery 391 to receive information on a charging status and/or a charge level of the battery 391.

Finally, the controller 372 is in communication with the mode indicator 161 to control display of different visual indications by the mode indicator 161 corresponding to the relevant current operational mode or status of the various components of the eyewear device 100.

Figure 4:
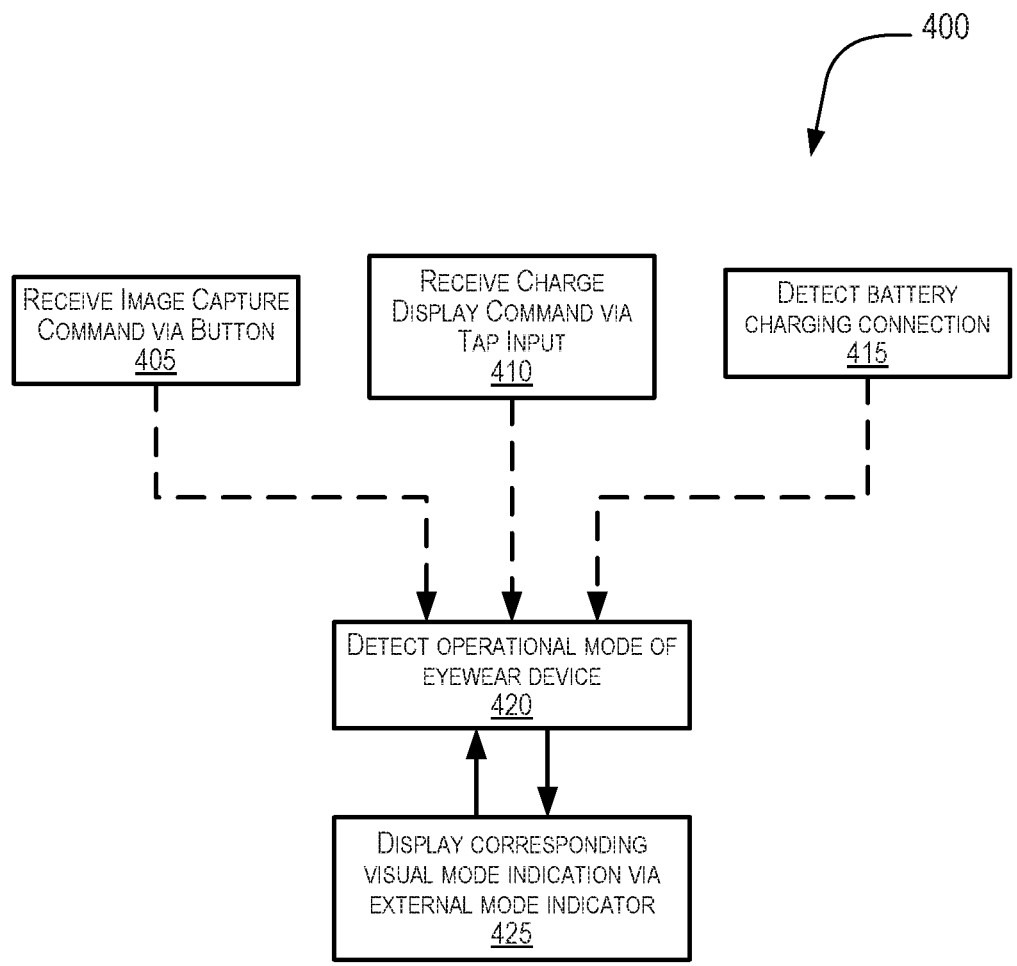
FIG. 4 is a schematic flowchart of a method of operating a camera-enabled eyewear device, according to an example embodiment.

FIG. 4 shows a flowchart 400 of an example method of operating the eyewear device 100 according to an example embodiment. In this example embodiment, the flowchart 400 illustrates operations performed by the controller 372 corresponding to the example embodiment of FIG. 3.

At operation 420, the controller 372 detects a current operational mode of the eyewear device 100. In some instances, the operational mode of the eyewear device 100 is triggered by user input or an external event. For example, an image-capture command may be received by the button input mechanism 312, at operation 405. As described previously, such an image-capture command can be a video capture command communicated by a press-and-hold operation. Upon resultant initiation of video capture by the camera 130, the controller 372 detects that the eyewear device 100 is in a video capture mode. In other instances, the image-capture command can be a photo capture command communicated via a short press of the button 173. Responsive to reception of such a photo capture command, the detected operational mode is a photo capture mode.

User input can in some instances include reception of a user command via tap input, at operation 410, to display a charge level of the onboard battery 391. In response to such a command, the eyewear device 100 is disposed to a charge level display mode. Operational mode of the eyewear device 100 can also be determined by a connection status of the charging port 364. For example, detection, at operation 415, of the establishment of a charging connection via the charging port 364 disposes the eyewear device to a battery charging mode.

Note that the example events of FIG. 4 that trigger changes in operational mode are non-exhaustive, and that many additional operational modes are contemplated for which corresponding visual indications are to be provided by the mode indicator 161. Examples include, but are not limited, to device pairing mode, system crashes, system reset, and error modes.

Responsive to detection of the current operational mode of the eyewear device, at operation 420, the controller 372 causes display of a corresponding visual mode indication via the mode indicator 161. As will be evident from the preceding description (e.g., the example modes described with reference to FIGS. 2A-2C) each of a plurality of predefined operational modes of the device 100 and/or the camera 130 has a corresponding unique visual indication pattern and/or animation performable via the mode indicator 161. Detection of operational mode is substantially continuous, so that a particular mode indication is displayed only during persistence of the corresponding operational mode. The relevant mode indication is thus displayed by the mode indicator 161 only during operation of the eyewear device 100 in the corresponding operational mode. For example, when a video capture event is completed, the animated circulation of illuminated LEDs 207 in the indicator 161 (FIG. 2A) ceases and the indicator is returned to a dormant mode in which all of the LEDs 207 are off.

This disclosure is not limited in extent to the specifically described example embodiment. Instead, it will be appreciated that a variety of embodiments including cumulative and/or alternative combinations of features is contemplated. Examples of such embodiments include, but is not limited to:

Example 1

An eyewear device comprising:
a camera incorporated in the eyewear frame;
a mode indicator comprising a series of light emitters mounted on an outwardly-directed surface of the eyewear frame; and
a controller incorporated in the eyewear frame in communication with the mode indicator, the controller being configured to: detect activation of a particular operational mode of the camera; and, during operation of the camera in the particular operational mode, cause display by the mode indicator of a visual indication corresponding to the particular operational mode of the camera.

Example 2

The device of claim 1, wherein the mode indicator is located on a forward-facing side of the eyewear frame, the mode indicator being directed away from a user when the eyewear device is worn by the user.

Example 3

The device of any one of examples 1-2, wherein the series of light emitters of the mode indicator are arranged in a ring-shaped configuration.

Example 4

The device of any one of examples 1-3, wherein the series of light emitters are arranged peripherally about a camera lens opening defined by the eyewear frame.

Example 5

The device of any one of examples 1-3, wherein the series of light emitters are arranged peripherally around a camera analog formation defined by the eyewear frame. In some examples, the device has two mode indicators comprising two rings of light emitters around two laterally spaced formations provided by any combination of formations selected from camera formations and camera analog formations.

Example 6

The device of any one of examples 1-5, wherein the plurality of light emitters of the mode indicator comprises a plurality of light emitting diodes (LEDs).

Example 7

The eyewear device of any one of examples 1-6, wherein the visual indication corresponding to the particular operational mode of the camera comprises displaying an animation pattern. The animation pattern may provide visual effect in motion, for example creating the effect of a circulating light or an otherwise moving light.

Example 8

The eyewear device above example 7, wherein the series of light emitters are arranged in a ring-shaped configuration, the animation pattern comprising circulating illumination of the light emitters in series.

Example 9

The eyewear device of example 8, wherein the particular operational mode of the camera to which the circulating animation pattern corresponds is a video capture mode.

Example 10

The eyewear device of example 9, wherein a speed of the circulating animation pattern is selected such as to provide an indication of progress towards completion of a predefined video clip length.

Example 11

The eyewear device of any one of examples 1-10, wherein the controller is configured to cause display by the mode indicator of a plurality of different visual indications corresponding to a plurality of respective different operational modes of the camera.

Example 12

The eyewear device of example 11, wherein the plurality of visual indications includes a video capture indication and a photo capture indication, corresponding respectively to a video capture mode and a photo capture mode of the camera.

Example 13

The eyewear device of example 11 or example 12, wherein the plurality of visual indications include a charge level indication that provides a visual indication of a level of charge of an on-board battery that is incorporated in the eyewear device and that powers the camera in use.

Example 14

The eyewear device of example 13, further comprising tap input control channel configured to enable user-triggering of the charge level indication by application of a predefined sequence of taps to the eyewear frame.

Example 15

An method comprising:
using one or more computer processing devices incorporated in an eyewear device, detecting activation of a particular operational mode of a camera incorporated in the eyewear device; and
during operation of the camera in the particular operational mode, causing display of a visual indication corresponding to the particular operational mode by a mode indicator comprising a series of light emitters mounted on an outwardly directed surface of the eyewear device.

Example 16

The method of example 15, wherein the visual indication is an animated visual indication.

Example 17

The method of example 16, wherein the particular operational mode of the camera is a video capture mode.

Example 18

The method of example 16 or 17, wherein the series of light emitters of the mode indicator comprises a ring of light emitting diodes (LEDs) on a front-facing surface of the eyewear device, the animated visual indication corresponding to the video capture mode comprising circulating illumination of the ring of LEDs in series.

Example 19

The method of any one of examples 15-18, further comprising causing display of different visual indications by the mode indicator corresponding to a plurality of respective different operational modes of the camera.

Example 20

The method of any example 15, corresponding to use of an eyewear device according to any one of examples 1-14.

Example 21

A non-transitory computer readable storage medium having stored thereon instructions for causing a machine, when executing the instructions, to perform operations comprising:
detecting activation of a particular operational mode of a camera incorporated in the eyewear device; and
during operation of the camera in the particular operational mode, causing display of a visual indication corresponding to the particular operational mode by a mode indicator comprising a series of light emitters mounted on an outwardly directed surface of the eyewear device.

Example 22

The storage medium of example 21, wherein the instructions are configured to cause a machine forming part of an eyewear device to provide the respective functionalities of any one of example 1-14, or to perform the method of any one of example 16-19.

Example Machine and Hardware Components

The example eyewear device described above may incorporate various computer components or machine elements, at least some of which are configured for performing automated operations and/or for automatically providing various functionalities. These include, for example, mode indication functionalities provided by the mode indicator 161 and/or the controller 372 of the example glasses 100. As discussed previously, the glasses 100 may provide an independent computer system. Instead, or in addition, the glasses 100 may form part of a distributed system including on ore more off-board processors and/or devices. It is to be understood that the description of example hardware and software architecture and components applies to some embodiments of electronics-enabled eyewear devices in isolation, to off-board components co-operating with such eyewear devices, or to such an eyewear device and supporting off-board components in combination, as the case may be.

Figure 5:
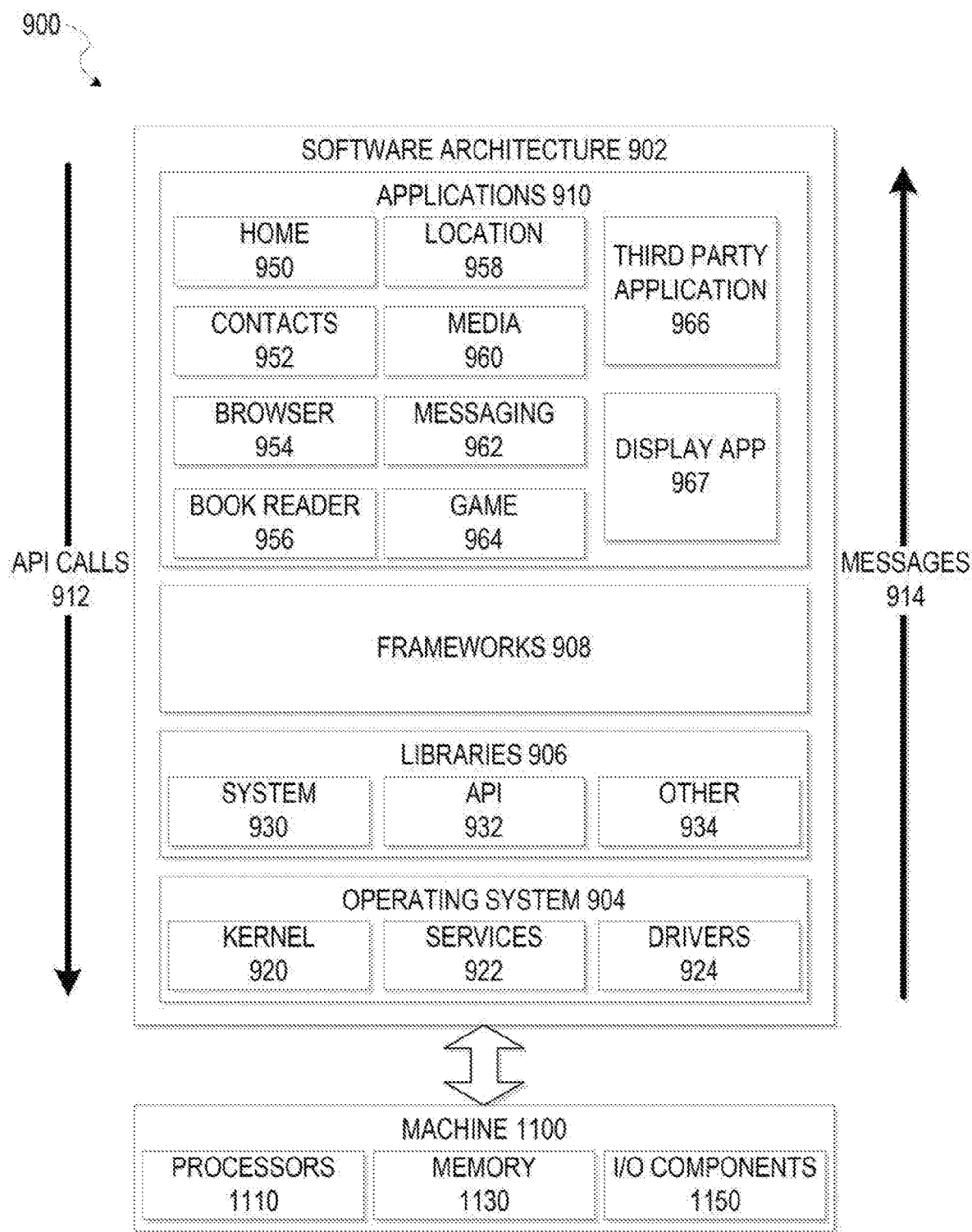
FIG. 5 is a block diagram illustrating an example of a software architecture that may be installed on a machine, according to some example embodiments.

FIG. 5 is a block diagram 900 illustrating an architecture of software 902, which can be installed on any one or more of the devices described above. FIG. 5 is merely a non-limiting example of a software architecture, and it will be appreciated that many other architectures can be implemented to facilitate the functionality described herein. In various embodiments, the software 902 is implemented by hardware such as machine 1100 of FIG. 6 that includes processors 1110, memory 1130, and I/O components 1150. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments. In various embodiments, any client device (e.g. the example eyewear device 100), server computer of a server system, or any other device described or referenced herein may operate using elements of software 902. Devices such as the controller 372 and the tap input mechanism 319, as described earlier, may additionally be implemented using aspects of software 902.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In certain implementations of a device such as the display mechanism 104 of smart glasses 100, low-power circuitry may operate using drivers 924 that only contain BLUETOOTH® Low Energy drivers and basic logic for managing communications and controlling other devices, with other drivers operating with high-speed circuitry.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 966 can invoke the API calls 912 provided by the operating system 904 to facilitate functionality described herein.

Embodiments described herein may particularly interact with a display application 967. Such an application 967 may interact with I/O components 1150 to establish various wireless connections with devices such as the controller 372 to control display of visual indications via the mode indicator 161. Display application 967 may communicate with the mode indicator 161 to automatically control display of computer-generated information via display mechanism 104.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module," should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. These considerations, and those that follow, applies equally to hardware modules and to electronic or logic processing and/or control components, controllers, engines, information processing mechanisms, and the like.

Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 6:
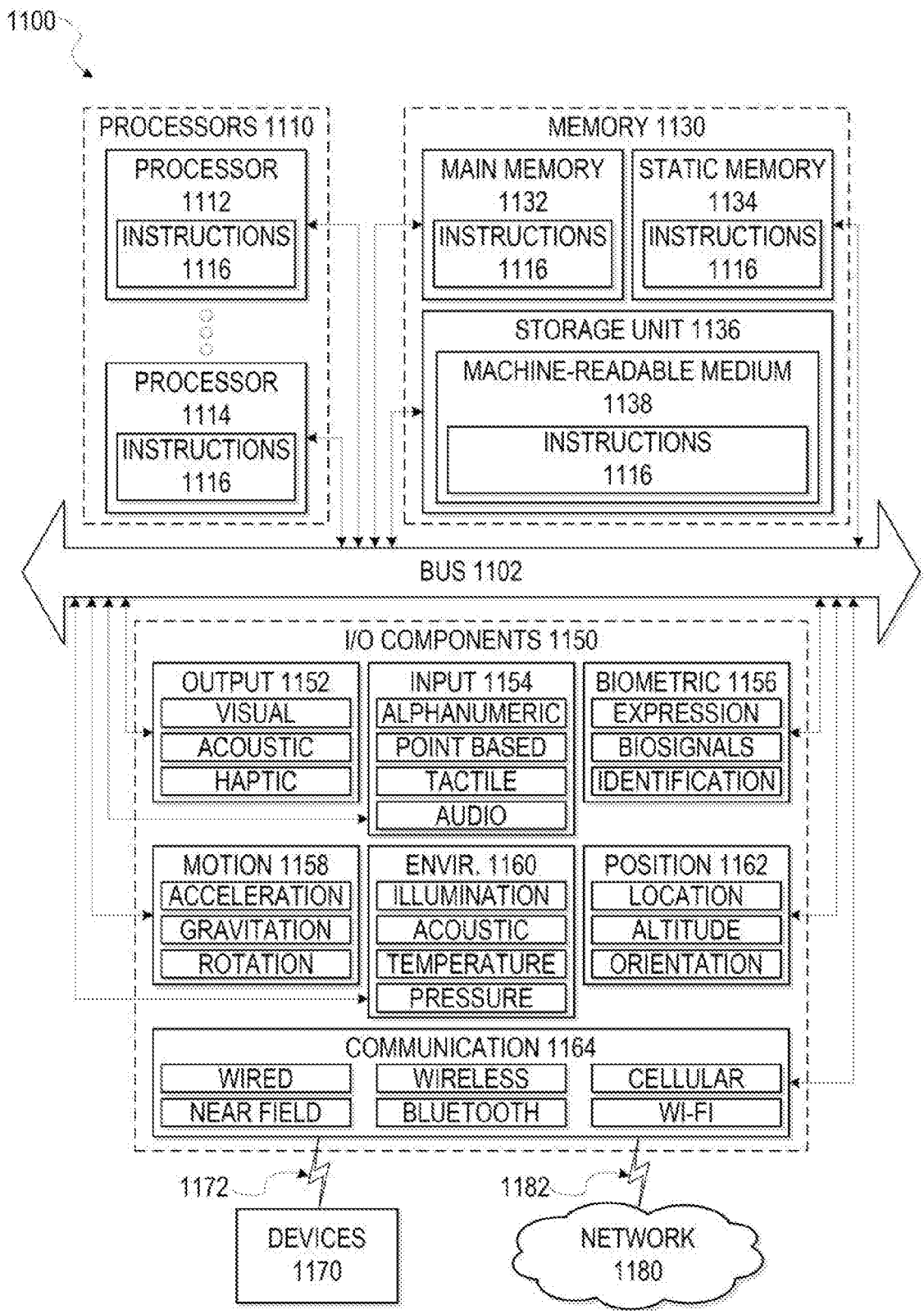
FIG. 6 illustrates a diagrammatic representation of a machine in the form of a computer system within which a set of instructions may be executed for causing the machine to perform any one or more of the methodologies discussed herein, according to an example embodiment.

FIG. 6 is a block diagram illustrating components of a machine 1100, according to some embodiments, able to read instructions from a machine-readable medium (e.g., a machine-readable storage medium) and perform any one or more of the methodologies discussed herein. Specifically, FIG. 6 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 6 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 6. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

What is claimed is:

1. An eyewear device comprising:
   an eyewear frame;
   a camera incorporated in the eyewear frame;
   a mode indicator comprising a series of light emitters mounted on an outwardly-directed surface of the eyewear frame; and
   a controller incorporated in the eyewear frame in communication with the mode indicator, the controller being configured to:
      detect activation of a video capture mode of the camera; and
      during operation of the camera in the video capture mode, cause display by the mode indicator of a visual indication corresponding to the video capture mode of the camera, the visual indication comprising an animation pattern performed by the series of light emitters.

2. The eyewear device of claim 1, wherein the mode indicator is located on a forward-facing side of the eyewear frame, the mode indicator being directed away from a user when the eyewear device is worn by the user.

3. The eyewear device of claim 2, wherein the series of light emitters of the mode indicator are arranged in a ring-shaped configuration.

4. The eyewear device of claim 3, wherein the series of light emitters are arranged peripherally about a camera lens opening defined by the eyewear frame.

5. The eyewear device of claim 3, wherein the series of light emitters are arranged peripherally around a camera analog formation defined by the eyewear frame.

6. The eyewear device of claim 1, wherein the plurality of light emitters of the mode indicator comprises a plurality of light emitting diodes (LEDs).

7. The eyewear device of claim 1, wherein the series of light emitters are arranged in a ring-shaped configuration, the animation pattern comprising circulating illumination of the light emitters in series.

8. The eyewear device of claim 7, wherein a speed of the circulating animation pattern is selected such as to provide an indication of progress towards completion of a predefined video clip length.

9. The eyewear device of claim 1, wherein the controller is configured to cause display by the mode indicator of a plurality of different visual indications corresponding to a plurality of respective different operational modes of the camera.

10. The eyewear device of claim 9, wherein the plurality of visual indications includes a photo capture indication and a video capture indication provided by the animation pattern, corresponding respectively to a video capture mode and a photo capture mode of the camera.

11. The eyewear device of claim 9, wherein the plurality of visual indications include a charge level indication that provides a visual indication of a level of charge of an on-board battery that is incorporated in the eyewear device and that powers the camera in use.

12. The eyewear device of claim 11, further comprising tap input control channel configured to enable user-triggering of the charge level indication by application of a predefined sequence of taps to the eyewear frame.

13. A method comprising:
   using one or more computer processing devices incorporated in an eyewear device, detecting activation of a video capture mode of a camera incorporated in the eyewear device; and
   during operation of the camera in the video capture mode, causing display of a visual indication corresponding to the video capture mode by a mode indicator comprising a series of light emitters mounted on an outwardly directed surface of the eyewear device, the visual indication comprising performance of an animation pattern by the series of light emitters.

14. The method of claim 13, wherein the series of light emitters of the mode indicator comprises a ring of light emitting diodes (LEDs) on a front-facing surface of the eyewear device, the animated visual indication corresponding to the video capture mode comprising circulating illumination of the ring of LEDs in series.

15. The method of claim 13, further comprising causing display of different visual indications by the mode indicator corresponding to a plurality of respective different operational modes of the camera.

16. A non-transitory computer readable storage medium having stored thereon instructions for causing a machine, when executing the instructions, to perform operations comprising:
   using one or more computer processing devices incorporated in an eyewear device, detecting activation of a video capture mode of a camera incorporated in the eyewear device; and
   during operation of the camera in the video capture mode, causing display of a visual indication corresponding to the video capture mode by a mode indicator comprising a series of light emitters mounted on an outwardly directed surface of the eyewear device, the visual indication comprising performance of an animation pattern by the series of light emitters.

* * * * *